United States Patent [19]

Benitez

[11] Patent Number: 5,181,139

[45] Date of Patent: Jan. 19, 1993

[54] RETRACTABLE BINOCULARS ATTACHABLE TO A VISOR

[76] Inventor: Jose A. Benitez, 5705 W. 12th La., Hialeah, Fla. 33012

[21] Appl. No.: 787,620

[22] Filed: Nov. 4, 1991

[51] Int. Cl.⁵ .......................... G02B 23/18; A42B 1/24
[52] U.S. Cl. .................................. 359/408; 359/410; 359/411; 351/155; 2/199
[58] Field of Search ............... 359/408, 409, 410, 411, 359/412–418; 351/155; 2/199

[56] References Cited

U.S. PATENT DOCUMENTS

| | | | |
|---|---|---|---|
| 2,598,145 | 5/1952 | Steadman | 359/410 |
| 2,625,855 | 1/1953 | Gaylor | 359/411 |
| 2,848,924 | 8/1958 | Potez | 359/411 |
| 3,425,769 | 2/1969 | Stone | 359/410 |
| 4,449,787 | 5/1984 | Burbo et al. | 359/411 |
| 4,839,926 | 6/1989 | Choi | 351/155 |
| 4,986,644 | 1/1991 | Yang | 359/410 |

FOREIGN PATENT DOCUMENTS 9003741  4/1990  Sweden ................... 2/199

Primary Examiner—Jon W. Henry
Attorney, Agent, or Firm—Skjerven, Morrill, MacPherson, Franklin & Friel

[57] ABSTRACT

Retractable binoculars, to be used in combination with and attached to a visor, the binoculars being structured and fitted to be positioned between a collapsed, out of the way position on the under side of the visor, or an extended, viewing position wherein an individual may look through the binoculars supportably attached to the visor being worn. The retractable binoculars include a frame member having a pair of large, front, magnifying lenses retractably attached to a distal end thereof, and a pair of smaller, rear, eye-piece lenses attached retractably to a proximate end of the support frame, such that when the front lenses are retracted, the rear lenses are caused to be retracted. Further, the binoculars include various adjustment means for focusing and conforming the binoculars to an individual user, and are removably attached at a mounting bracket to the under side of the visor.

16 Claims, 4 Drawing Sheets

RETRACTABLE BINOCULARS ATTACHABLE TO A VISOR

BACKGROUND OF THE INVENTION

1. Field of the Invention

This invention relates to a retractable binocular assembly, to be used in combination with and attached to a visor, thereby providing a user with easy-to-use, retractable, and convenient magnifying means, which do not need to be held by the user, are adjustable for a comfortable fit, and do not obstruct the vision of the user when not in use.

2. Description of the Prior Art

Often individuals, such as spectators at a sporting event, find themselves desiring magnification of occurrences at a distant point. This is especially true in light of the size of many large arenas or activities wherein an individual finds himself/herself far away from the activities they desire to see due to the presence of large crowds of people also present. Accordingly, those individuals often bring binoculars which they must hold up to their eyes when using, an act which may become cumbersome and tiresome, thereby discouraging the individual from carrying the binoculars or viewing activities for an extended period of time through the binoculars. As a result, it would be highly beneficial to provide an individual with magnifying means that would be easy to carry around and use, equally as effective as common binoculars, and quickly and conveniently storable when not in use.

In the past, individuals have attempted to design magnifiers to be worn as a visor on an individual's head. One such example is in the patent to Steadman, Jr., U.S. Pat. No. 2,598,145. The patent to Steadman, which is a combination visor and magnifier, while providing a magnifier to be worn on a person's head, does not provide for the collapsibility of the magnifier so that the visor may be used without utilizing the magnifier, and thereby facilitating the carrying of the magnifier even when it is not in use. Further, the combination visor and magnifier of Steadman is not adjustable with regard to the orientation of the lenses. A second such example of a prior attempt to design binoculars to be worn on the head, in referenced in the patent to Choi, U.S. Pat. No. 4,839,926. The patent to Choi provides a cap having binoculars integrally formed within the visor portion, and having eye holes in the brim of the cap such that the cap must be pulled down over the individual's eyes when using the binoculars. Such a design is highly cumbersome to wear as well as to position, does not allow for quick engagement of the magnifier, and does not allow for independent use of the cap. Accordingly, there is still a need for a binocular assembly which is quick and easy to position and store, is highly effective and adjustable, does not restrict vision when not in use, and may be completely detached for independent use, use with a different cap, or independent use of the cap.

Applicant's invention provides an assembly which meets all the present needs with regard to a retractable binocular assembly, and overcomes much of the awkwardness of prior inventions. Applicant's design is a compact unit, which may be quickly and easily positioned, may be easily adjusted for any cap and any user, and does not obstruct the vision of the user when not in use. Applicant's innovative design provides a convenient and highly useful means of utilizing binoculars, while keeping an individual's hands free.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
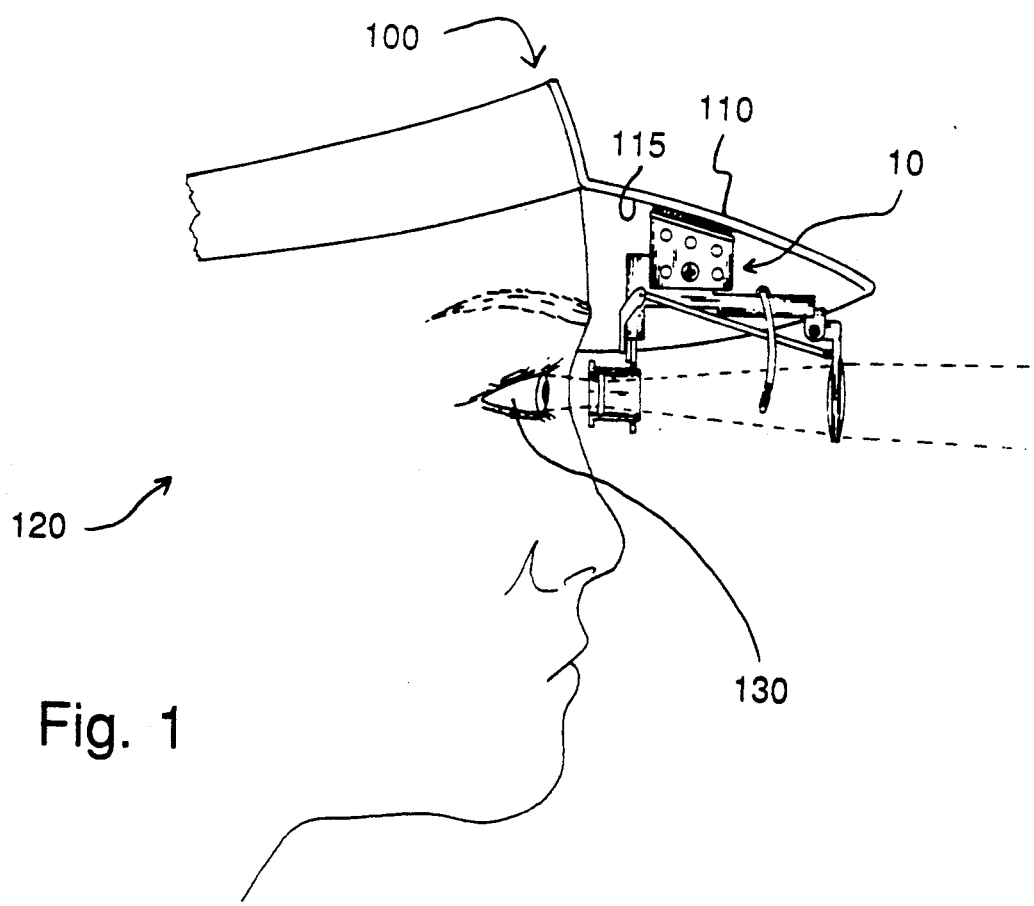
FIG. 1 is a side view of the binocular assembly mounted to a visor on a user's head.

As shown throughout FIGS. 1-9, the present invention is directed towards a binocular assembly, generally indicated as 10. The binocular assembly 10, as shown in FIG. 1, is structured to be mounted to the under side 115 of the visor 110, of an article of head wear 100 worn on the head of a user 120. The binocular assembly 10 is structured such that when it is in an extended, operable position, it is aligned with the eyes 130 of a user 120, thereby providing hands-free magnification of distant objects.

Figure 2:
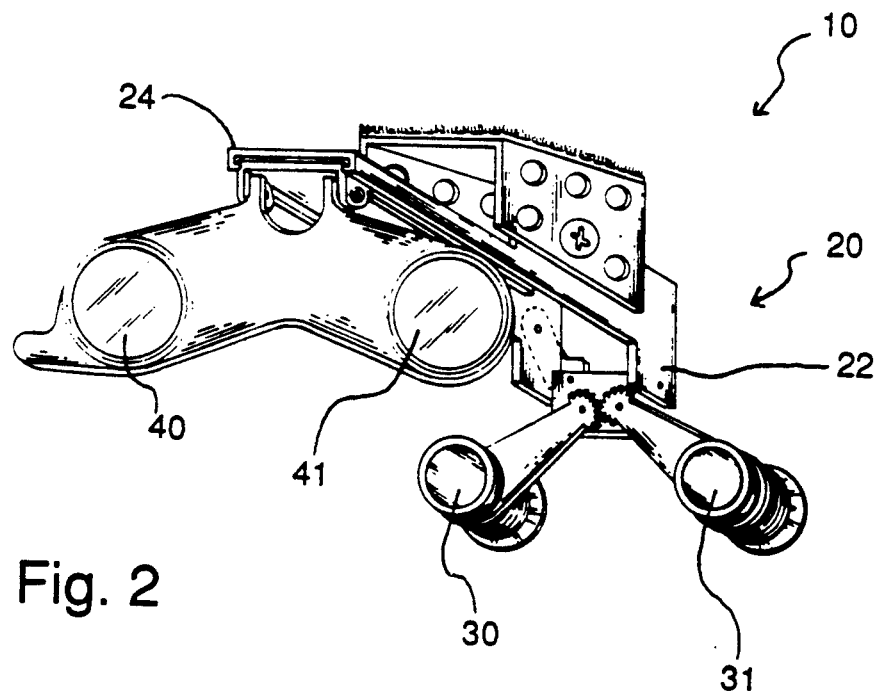
FIG. 2 is a perspective view of the binocular assembly.
Figure 3:
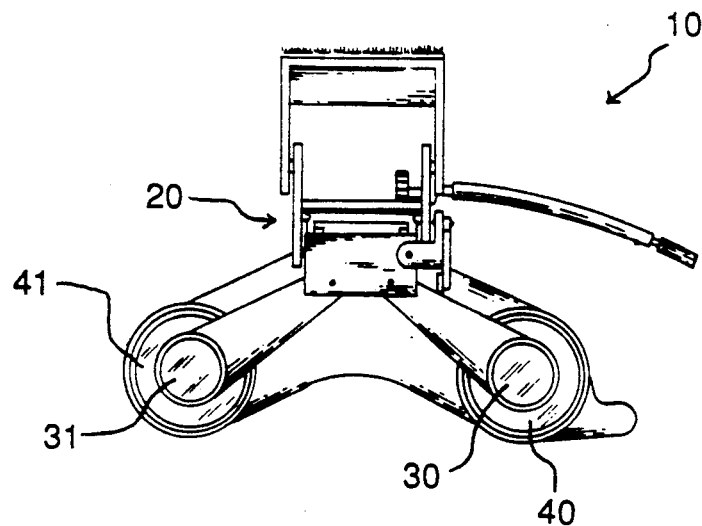
FIG. 3 is a rear view of the binocular assembly.

Turning to FIG. 2, the binocular assembly 10 includes primarily a supporting frame member 20 having a proximal end 22 and a distal end 24. Attached at the proximal end 22 of the frame member 20 are a pair of eye-piece lenses 30 and 31. Slidably attached at the distal end 24 of the frame member 20 are a pair of objective lenses 40 and 41. As seen in FIG. 3, the right eye-piece lens 30 and right objective lens 40, as well as the left eye-piece lens 31 and left objective lens 41, are in axial alignment with one another, thereby causing a clear magnifying effect.

Figure 4:
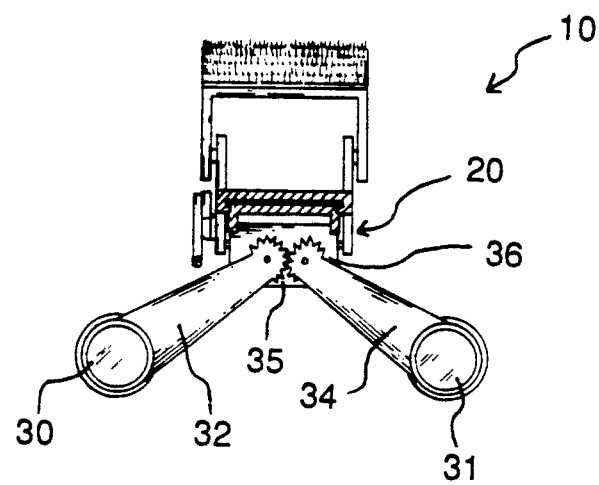
FIG. 4 is a cross-sectional view of the binocular assembly, looking towards the rear.

The right eye-piece lens 30 and left eye-piece lens 31, as shown in FIG. 4, are mounted within a right eye-piece bracket 32 and a left eye-piece bracket 34, correspondingly. The right eye-piece bracket and left eye-piece bracket 34 are structured and disposed at a distal end thereof to form a congruent, interlocking gear portion 35 at their point of attachment to a hinge mount 36. The congruently interlocking gear portion 35 results in the right eye-piece bracket 32 and left eye-piece bracket 34 moving evenly and simultaneously closer or farther apart for adjustment for an individual user 120.

Figure 5:
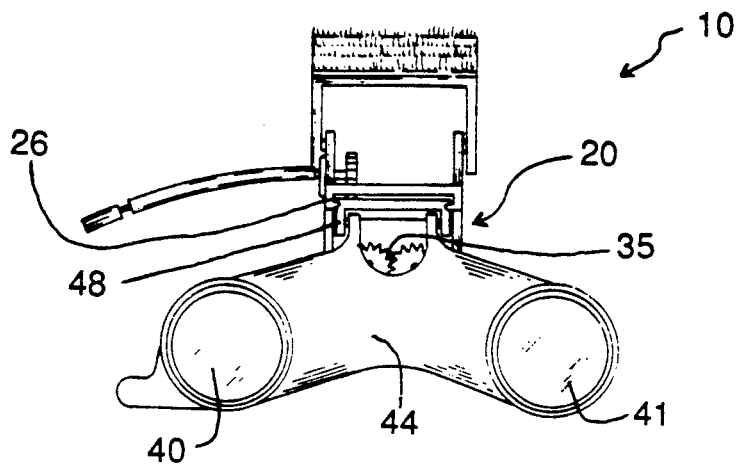
FIG. 5 is a front view of the binocular assembly.

Referring to FIG. 5, the right objective lens 40 and left objective lens 41 are mounted in spaced apart relation to one another in a generally C-shaped frame 44. The C-shaped frame 44, which holds the right objective lens 40 and left objective lens 41, is hingedly attached to a sliding bracket 48. The sliding bracket 48 is mounted within a track 26 formed in the frame member 20, such that the sliding bracket 48 may be moved forward or backward when desired.

Figure 6:
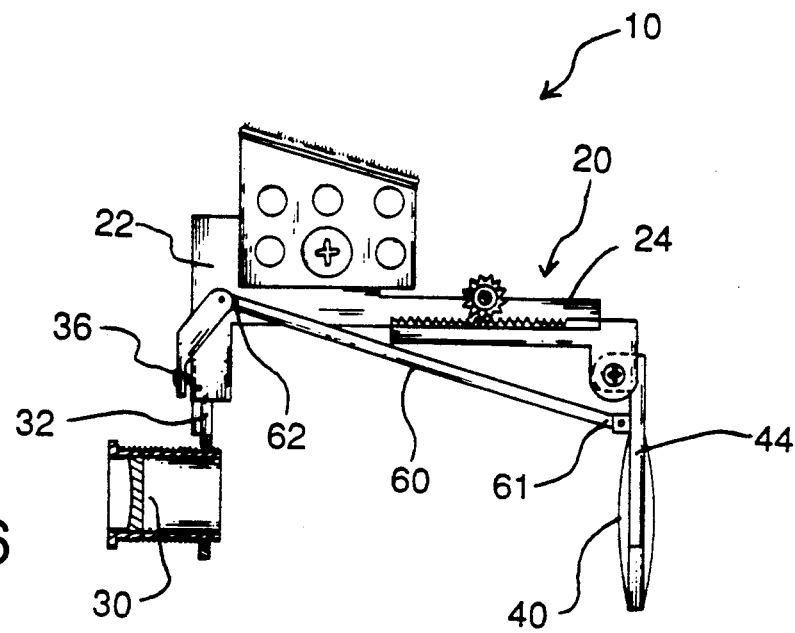
FIG. 6 is a side view of the extended binocular assembly.

The binocular assembly 10, shown in an extended operable position in FIG. 6, includes a brace bar 60 interconnecting the objective lenses 40 and 41 to the eye-piece lenses 30 and 31 for facilitated, simultaneous movement thereof between an extended, operable position, and a collapsed, stored position. More specifically, the brace bar 60 is secured at a distal end 61 thereof to the C-shaped frame 44, and at a proximal end 62 thereof to the hinge mount 36. Accordingly, a user need only push upward on the C-shaped frame 44 to bring the binocular assembly 10 to its collapsed position, shown in FIG. 7.

Figure 7:
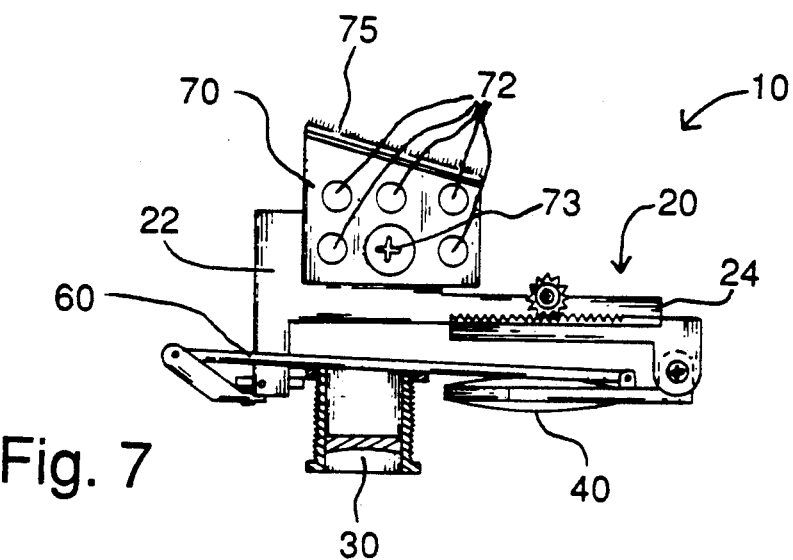
FIG. 7 is a side view of the collapsed binocular assembly.

Further referring to FIG. 7, the binocular assembly 10 includes a mounting bracket 70 whereupon the frame member 20 may be secured. The mounting bracket 70 includes a plurality of mounting points 72, such that the binocular assembly may be correspondingly mounted to a variety of visors 110, having assorted structures. The frame member 20 is secured to the mounting bracket 70 by a screw 73 passing through one of the plurality of mounting points 72, and through the frame member 20.

Figure 8:
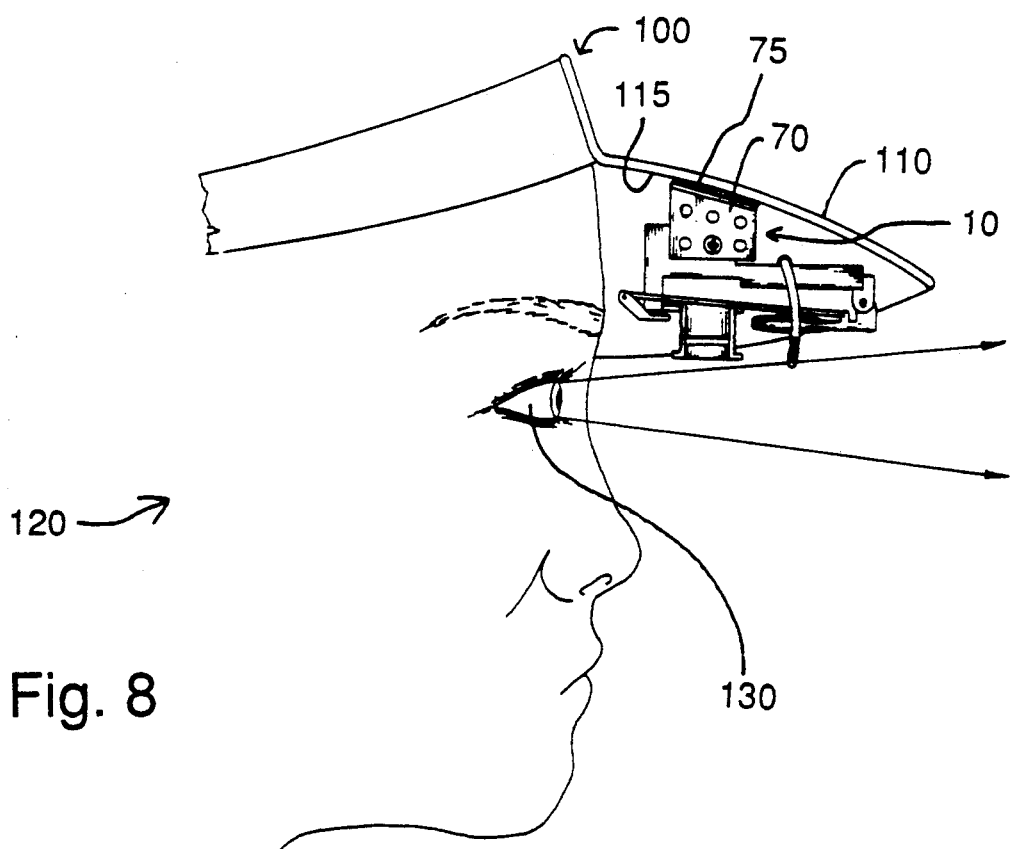
FIG. 8 is a side view of a collapsed binocular assembly mounted to a visor worn on a user's head.

The binocular assembly 10 when in its collapsed position, as shown in FIG. 8, is structured and disposed to be completely removed from in front of the eye 130 of user 120, thereby facilitating clear visibility when the binocular assembly 10 is not in use. In this preferred embodiment, the binocular assembly 10 may be removably attached to the under side 115 of the visor 110 by a hook and loop fastener 75 attached to the mounting bracket 70 and the under side 115 of the visor 110, thereby allowing complete removal of the binocular assembly 10 if the user 120 desires.

Figure 9:
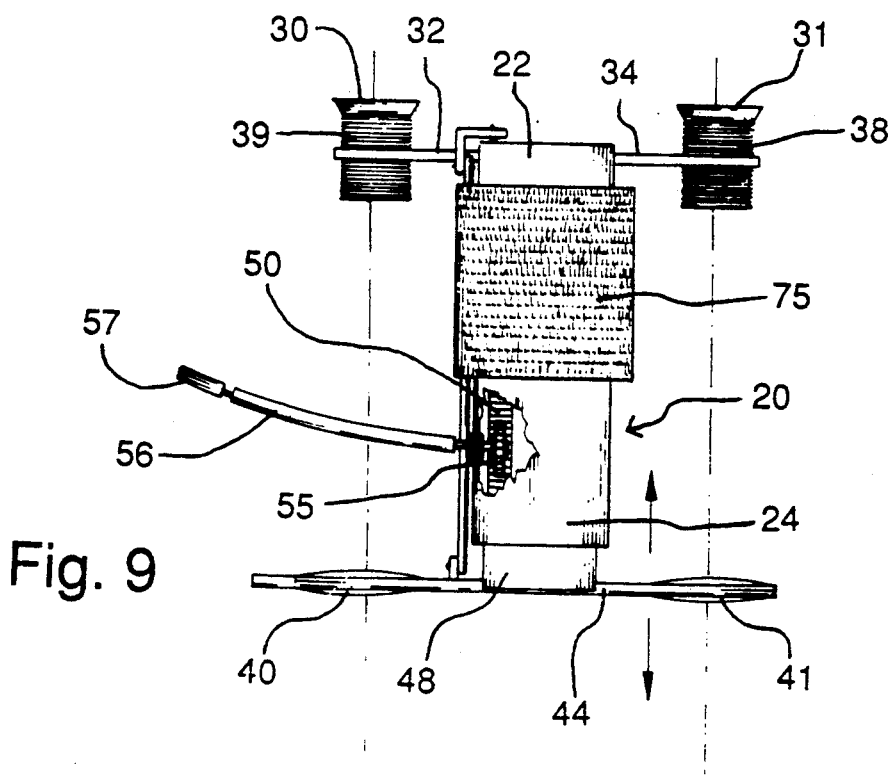
FIG. 9 is a top plan view of the binocular assembly.

Finally, in order to ensure clear magnification, a variety of features, best detailed in FIG. 9, have been included with the binocular assembly 10. First, the right eye-piece lens 30 and left eye-piece lens 31 include threaded exterior portions 38 and 39, correspondingly, such that each or both of the eye-piece lenses 30 and 31, may be moved closer or further from the eye 130 within their respective eye-piece brackets 32 and 34. Second, the sliding bracket 48 includes a notched upper surface 50 wherein a gear 55 may be congruently interlocked. The gear 55 may be easily adjusted by turning to the distal end 57 of a protruding co-axial cable 56, and thereby causing the sliding bracket 48, and as a result the objective lenses 40 and 41 to move closer to or further from the eye-piece lenses 30 and 31, and accordingly provide a clear focus.

Now that the invention has been described,

What is claimed is:

1. For use in combination with head wear, a binocular assembly adapted to be attached to an underside of a visor of the head wear, said assembly comprising:

a supporting frame member including a proximal end and a distal end, said frame member having a top surface structured and disposed for mating engagement with said underside of said visor;

a pair of objective lenses, including a left objective lens and a right objective lens movably mounted to said distal end of said frame member in spaced, co-planar relation to one another;

a pair of eye-piece lenses, including a left eye-piece lens and a right eye-piece lens movably mounted to said proximal end of said frame member in spaced, co-planar relation to one another, said left objective lens being in axial alignment with said left eye-piece lens and said right objective lens being in axial alignment with said right eye-piece lens when in an extended, operable position;

linkage means interconnecting said object lenses to said eye-piece lenses for facilitating simultaneous movement thereof between said extended, operable position, and a collapsed, stored position when said assembly is attached to said underside of said visor; and means for longitudinally and continuously moving said objective lenses relative to said eye-piece lenses using an adjustment means, while said assembly is attached to said underside of said visor, so as to facilitate focusing on an object, said assembly, when attached to said underside of said visor worn by a user, being structured and disposed to be substantially nonobstructive to the vision of said user when said pair of objective lenses and said pair of eye-piece lenses are in said collapsed, stored position.

2. A binocular assembly as recited in claim 1 wherein said pair of eye-piece lenses include congruently interlocking gear portions at a point of hinged attachment of each of a pair of eye-piece brackets to said supporting frame member, such that said pair of eye-piece lenses will correspondingly move closer or further apart with the motion of one of said pair of eye-piece lenses.

3. A binocular assembly as recited in claim 1 wherein each of said pair of eye-piece lenses includes a threaded exterior portion such that one or both of said pair of eye-piece lenses may be moved closer to or further from the eye of the user when in said extended, operable position, thereby providing for individualized focusing.

4. A binocular assembly as recited in claim 1 wherein said pair of objective lenses are mounted in generally spaced apart relation to one another in a generally C-shaped frame.

5. A binocular assembly as recited in claim 4 wherein said C-shaped frame is hingedly secured to a sliding bracket, which is a part of said means for longitudinally moving said objective lenses.

6. A binocular assembly as recited in claim 1 wherein said means for longitudinally moving said objective lenses further includes a track formed in said support frame member, wherein said objective lenses may move longitudinally by using said adjustment means.

7. A binocular assembly as recited in claim 6 wherein said adjustment means includes a gear mounted in congruently interlocking relation to a notched upper surface of a sliding bracket connected to said objective lenses, thereby causing said sliding bracket to move longitudinally when said gear is turned.

8. A binocular assembly as recited in claim 1 wherein said linkage means includes a brace bar attached between means for securing said eye-piece lenses and means for securing said objective lenses, such that upward, collapsing motion of said pair of objective lenses will result in simultaneous upward, collapsing motion of said pair of eye-piece lenses, thereby making said assembly non-obstructive to the vision of said user in said collapsed, stored position.

9. A binocular assembly as recited in claim 1 wherein said frame member is attached to said underside of said visor by a hook and loop fastener.

10. A binocular assembly adapted to be attached to an underside of a visor, said assembly comprising:

a supporting member including a proximal portion and a distal portion;

a pair of objective lenses, including a left objective lens and a right objective lens movably mounted to said distal portion of said supporting member in a spaced, substantially co-planar relation to one another, said pair of objective lenses being movably mounted so as to enable positioning of said objective lenses in either an extended, operable position or a collapsed, stored position;

a pair of eye-piece lenses, including a left eye-piece lens and a right eye-piece lens movably mounted to said proximal portion of said supporting member in a spaced, substantially co-planar relation to one another, said pair of eye-piece lenses being movably mounted so as to enable positioning said eye-piece lenses in either an extended, operable position or a collapsed, stored position; and means for continuously moving said objectives lenses relative to said eye-piece lenses, while said assembly is attached to said underside of said visor, so as to facilitate focusing on an object, said assembly, when attached to said underside of said visor worn by a user, being structured to be substantially nonobstructive to the vision of said user when said pair of objective lenses and said pair of eye-piece lenses are in said collapsed, stored position.

11. The binocular assembly as recited in claim 10 further comprising a linkage means interconnecting said objective lenses to said eye-piece lenses for facilitating simultaneous movement thereof between said extended, operable position and said collapsed, stored position.

12. The binocular assembly as recited in claim 10 wherein said left objective lens is in axial alignment with said left eye-piece lens and said right objective lens is in axial alignment with said right eye-piece lens when in said extended, operable position.

13. The binocular assembly as recited in claim 10 wherein said supporting member includes a top surface structured and disposed for mating engagement with an underside of a visor so as to mount the assembly thereto.

14. A binocular assembly as recited in claim 13 wherein said supporting member is attached to the underside of the visor by a hook and a loop fastener.

15. A binocular assembly as recited in claim 10 wherein each is said eye-piece lenses includes a threaded portion such that one or both of said eye-piece lenses may be moved closer to or further from said objective lenses when in said extended, operable position, thereby providing for individualized focusing.

16. A binocular assembly as recited in claim 10 wherein said means for moving said objective lenses includes a track formed in said supporting member, wherein said objective lenses may move longitudinally in said track by using an adjustment means.

* * * * *